July 14, 1953  R. O. ISENBARGER  2,645,507
SELF-CONTAINED OIL SEAL
Original Filed Feb. 14, 1947
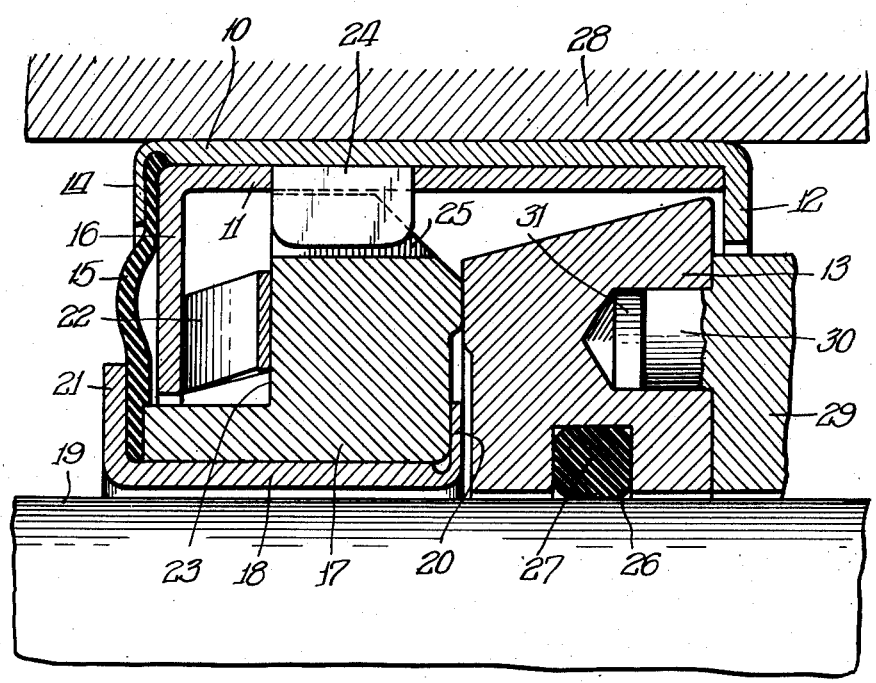
INVENTOR.
Robert O. Isenbarger,
BY
Cromwell, Greist & Warden
Attys.

Patented July 14, 1953

2,645,507

UNITED STATES PATENT OFFICE 2,645,507

SELF-CONTAINED OIL SEAL

Robert O. Isenbarger, Chicago, Ill., assignor to Chicago Rawhide Manufacturing Company, Chicago, Ill., a corporation of Illinois Original application February 14, 1947, Serial No. 728,659, now Patent No. 2,489,781, dated November 29, 1949. Divided and this application August 11, 1949, Serial No. 109,781

5 Claims. (Cl. 286—11)

This invention pertains in general to a shaft seal or the like, adapted to be associated with a pair of relatively rotatable parts to prevent leakage of fluid therebetween. The present application is a division of my co-pending application Serial No. 728,659, filed February 14, 1947, now Patent No. 2,489,781 of November 29, 1949.

It is a general object of the invention to provide an improved unitary seal assembly of the type described which is of completely self-contained construction, including a sealing ring adapted to be mounted in fixed relation to one of a pair of relatively rotatable parts and a coacting mating ring having relatively fixed engagement with the other of said parts, said seal assembly having further provisions including a flexible, radially extending diaphragm which extends between certain housing and mounting elements of the seal and a further shaft sealing element which rings, diaphragm and shaft sealing element serve to prevent passage of fluid at any point radially or axially of the seal assembly.

The foregoing statement is indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming equally within the scope of the appended claims.

In the drawing,

The figure is an enlarged fragmentary view in longitudinal axial section through a seal in accordance with the invention, shown in operative relation to a part sealed thereby.

The invention relates to improvements in a self-contained shaft or like seal characterized by coacting sealing and mating rings which are fixedly engageable respectively with a pair of relatively rotatable parts, said rings having coacting sealing surfaces effecting a rotative, sliding seal. A feature of the assembly is that the aforesaid rings are permanently housed in a sealed housing structure including a flexible diaphragm and a sheet metal casing, the rings being capable of yielding end or axial movement in said structure in operation and being axially restrained by a casing or mounting element of the seal to prevent separation prior to assembly to the relatively rotatable parts which are to be sealed. An embodiment of the invention in which the flexible diaphragm referred to is radial in character is shown. This diaphragm bridges two relatively axially shiftable components one of which mounts one of the ring members, so as to perfect the operation of the seal in preventing entry of dirt or foreign matter.

Referring to the drawing, a sheet metal housing for the seal is defined in part by the telescopingly force-fitted, annular flanged casing members 10, 11 respectively. At one side thereof the outermost member 10 is to provide an annular retaining or stop rim 12 for the mating ring 13 which holds the latter in assembly when the seal is not applied to the parts to be sealed. At the other side thereof the member has an inwardly spun lip 14 of reduced thickness which serves to clamp the outer periphery of radial diaphragm 15 against an adjacent radial wall or flange 16 of the innermost casing member 11. A sealing ring 17 is fixedly mounted on an annular, sheet metal inner support 18 of U-shaped cross section encircling but spaced from shaft 19 to which the seal is applied. This support clamps the sealing ring 17 to the inner periphery of the diaphragm to provide a unitary assembly located radially inwardly of the radial wall 16 of casing member 11 and slidable axially relative to the members 10, 11. Forward and rearward lips 20, 21 on support 18 serve to secure the sealing ring 17 in place and to coact with a rear surface on said ring in clamping the internal diaphragm periphery thereto. It will be noted that a slight bulge is provided in the radial diaphragm to accommodate flexing thereof in the axial movement of the sealing ring. The rigid casing structure and diaphragm define a seal housing which is effectively closed at all points on the rear portion of the assembly.

An annular undulatory or wave spring 22 is disposed in the space between the forwardly stepped rear surface 23 of sealing ring 17 and the radial casing wall 16 to urge the sealing ring forwardly against a coacting surface on mating ring 13. The sealing ring is keyed to the casing member 11 in a manner to prevent relative rotation by means of a down-turned lug 24 on the latter engageable in a slot 25 of the sealing ring. Free relative axial movement in the operation of the seal is permitted, however.

The mating ring 13 is provided with an internal annular groove 26 in which an annular packing member or O-ring 27 or an appropriate compressible material is disposed, this member sealingly engaging the shaft 19 to prevent passage of fluid at a point radially inwardly of the mating ring.

The assembly of the seal to a pair of relatively rotatable parts, such as the shaft 19 and a housing, designated 28, may be effected by force fitting casing member 10 in said housing and assembling the mating ring in end thrust transmitting relation to a further member 29, whereby to compress spring 22. The mating ring is held in angularly fixed relation to member 29 by a pin or pins 30 on said member which are receivable in recesses 31 in the mating ring. In operation the seal functions to prevent leakage at three points i. e., between shaft 19 and packing member 27, between the coacting running surfaces of the sealing and mating rings, and at the radial diaphragm.

It is apparent that variations can be made in certain of the specific details shown and described without departing from the spirit of the invention, hence, the invention should not be construed more narrowly than is consistant with the scope of the appended claims.

I claim:

1. A self-contained seal comprising concentric sealing and mating rings having relatively rotative, end sealing engagement with one another, a rigid casing externally housing said rings and adapted to be secured to a part to be sealed, said casing including a member having a radially extending flange disposed rearwardly of said sealing ring and a further member in fixed engagement with said member adjacent the periphery thereof, a spring acting between said flange and sealing ring to urge the latter against said mating ring, an annular, radially extending diaphragm having its outer margin fixedly secured to said casing rearwardly and externally of the flange thereof by clamped engagement of said margin between said flange and further member, and an annular mounting member in axially telescoped, concentric relation to said sealing ring, said mounting member clamping said sealing ring in fixed relation to the inner margin of said diaphragm.

2. A self-contained seal in accordance with claim 1, in which one of said casing members is provided with a radially extending element adapted to be engaged by said mating ring to hold the latter in assembly with said sealing ring when the latter is otherwise unsustained in a rearward axial direction.

3. A self-contained seal comprising concentric sealing and mating rings having relatively rotative, end sealing engagement with one another, a rigid casing externally housing said rings and adapted to be secured to a part to be sealed, said casing including a member having a radially extending flange disposed rearwardly of said sealing ring and a further member in fixed engagement with said member adjacent the periphery thereof, an axially acting spring in compression between said flange and sealing ring to urge the latter against said mating ring, an annular, radially extending diaphragm having its outer margin fixedly secured to said casing rearwardly and externally of the flange thereof by clamped engagement of said margin between said flange and further member, and means securing the inner margin of said diaphragm to said sealing ring.

4. A self-contained seal in accordance with claim 3, in which one of said casing members is provided with a radially extending element adapted to be engaged by said mating ring to hold the latter in assembly with said sealing ring when the latter is otherwise unsustained in a rearward axial direction.

5. A self-contained seal comprising concentric sealing and mating rings having relatively rotative, end sealing engagement with one another, a rigid casing externally housing said rings and adapted to be secured to a part to be sealed, said casing including a member having a radially extending flange disposed rearwardly of said sealing ring and a further member in fixed engagement with said member adjacent the periphery thereof, an axially acting spring in compression between said flange and sealing ring to urge the latter against said mating ring, an annular, radially extending diaphragm having its outer margin fixedly secured to said casing rearwardly and externally of the flange thereof by clamped engagement of said margin between said flange and further member, and an annular mounting member in axially telescoped, concentric relation to said sealing ring, said mounting member clamping said sealing ring in fixed relation to the inner margin of said diaphragm.

ROBERT O. ISENBARGER.

References Cited in the file of this patent
UNITED STATES PATENTS

| Number | Name | Date |
| --- | --- | --- |
| 2,311,494 | Vedovell | Feb. 16, 1943 |
| 2,342,955 | Meyer | Feb. 29, 1944 |
| 2,347,118 | Matter | Apr. 18, 1944 |
| 2,405,464 | Storer | Aug. 6, 1946 |
| 2,444,713 | Solari | July 6, 1948 |
| 2,444,714 | Voytech | July 6, 1948 |
| 2,445,018 | Brady | July 13, 1948 |
| 2,498,739 | Magnesen | Feb. 28, 1950 |